US012618341B2

(12) United States Patent
Porco et al.

(10) Patent No.: US 12,618,341 B2
(45) Date of Patent: May 5, 2026

(54) GAS TURBINE ENGINE DISASSEMBLY/ASSEMBLY METHODS

(71) Applicant: Pratt & Whitney Canada Corp., Longueuil (CA)

(72) Inventors: Carlo S. Porco, King City (CA); Geoffrey Henriksen, Mississauga (CA); Jason Wedemire, Erin (CA); Anthony Mathias, Kettleby (CA); Michael Hunze, Ancaster (CA); Louis Lavoie, Brampton (CA); Marven Paynter, Millgrove (CA); Dennis Wilkinson, Barrie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 163 days.

(21) Appl. No.: 18/233,652

(22) Filed: Aug. 14, 2023

(65) Prior Publication Data

US 2023/0392520 A1 Dec. 7, 2023

Related U.S. Application Data

(62) Division of application No. 17/388,865, filed on Jul. 29, 2021, now Pat. No. 11,725,542.

(51) Int. Cl.
*F01D 25/28* (2006.01)

(52) U.S. Cl.
CPC ........ *F01D 25/285* (2013.01); *F05D 2230/68* (2013.01); *F05D 2230/70* (2013.01)

(58) Field of Classification Search
CPC . F01D 25/285; F01D 2230/68; F01D 2230/70
See application file for complete search history.

(56) References Cited

U.S. PATENT DOCUMENTS

| | | | |
|---|---|---|---|
| 3,823,553 | A | 7/1974 | Smith |
| 7,861,512 | B2 | 1/2011 | Olver |
| 8,347,500 | B2 | 1/2013 | Durocher |
| 9,194,296 | B2 | 11/2015 | Vrljes |
| 10,094,277 | B2 | 10/2018 | Hanrahan |
| 10,823,055 | B2 | 11/2020 | Joshi |
| 2004/0255573 | A1 | 12/2004 | Rago |
| 2008/0014084 | A1 | 1/2008 | Eleftheriou |
| 2008/0060344 | A1 | 3/2008 | Durocher |

(Continued)

FOREIGN PATENT DOCUMENTS

| | | | |
|---|---|---|---|
| GB | 2320527 | A | 6/1998 |
| JP | 2002188513 | A | 7/2002 |

*Primary Examiner* — Nirvana Deonauth
(74) *Attorney, Agent, or Firm* — Getz Balich LLC

(57) ABSTRACT

A method is provided for disassembling a gas turbine engine. The gas turbine engine includes a compressor section, a combustor section, a turbine section, a static structure and a bypass duct. The static structure houses and supports the compressor section, the combustor section and the turbine section. The static structure includes a turbine support structure. The bypass duct includes an inner duct wall, an outer duct wall and a bypass flowpath formed radially between the inner duct wall and the outer duct wall. The outer duct wall extends axially along the static structure and overlaps the turbine support structure. During the method, the turbine support structure is removed from the gas turbine engine while the outer duct wall remains installed.

15 Claims, 11 Drawing Sheets

(56) References Cited

U.S. PATENT DOCUMENTS

| | | | |
|---|---|---|---|
| 2011/0079019 A1 | 4/2011 | Durocher | |
| 2013/0177410 A1 | 7/2013 | Eleftheriou | |
| 2014/0075918 A1 * | 3/2014 | Mercier | F02K 1/80<br>415/121.3 |
| 2015/0308291 A1 | 10/2015 | Brown | |
| 2015/0369123 A1 | 12/2015 | Hanrahan | |
| 2016/0341043 A1 | 11/2016 | Li | |

* cited by examiner

GAS TURBINE ENGINE DISASSEMBLY/ASSEMBLY METHODS

This application is a divisional of U.S. patent application Ser. No. 17/388,865 filed Jul. 29, 2021, which is hereby incorporated herein by reference in its entirety.

BACKGROUND OF THE DISCLOSURE

1. Technical Field

This disclosure relates generally to a gas turbine engine and, more particularly, to methods for disassembling and assembling the turbine engine.

2. Background Information

A gas turbine engine is a complex system with various different sections, modules and components. There is a need to inspect, repair and/or replace various components within the turbine engine. Thus, from time to time, the turbine engine may be disassembled to remove the desired components for inspection, repair and/or replacements. There are various methods known in the art for disassembling and then reassembling a gas turbine engine to remove and then install/reinstall various components. While these known methods have various advantages, there is still room in the art for improvement. For example, there is a need for a method of removing an internal component from a gas turbine engine such as a mid-turbine frame without significantly disassembling other sections, modules and/or structures of the turbine engine.

SUMMARY OF THE DISCLOSURE

According to an aspect of the present disclosure, an engine disassembly method is provided. During this method, a gas turbine engine is provided. This gas turbine engine includes a compressor section, a combustor section, a turbine section, a static structure and a bypass duct. The static structure houses and supports the compressor section, the combustor section and the turbine section. The static structure includes a turbine support structure. The bypass duct includes an inner duct wall, an outer duct wall and a bypass flowpath formed radially between the inner duct wall and the outer duct wall. The outer duct wall extends axially along the static structure and overlaps the turbine support structure. The turbine support structure is removed from the gas turbine engine while the outer duct wall remains installed.

According to another aspect of the present disclosure, another engine disassembly method is provided. During this method, a gas turbine engine is provided. This gas turbine engine includes a compressor section, a combustor section, a turbine section and a static structure. The turbine section includes a first turbine rotor and a second turbine rotor. The static structure houses and supports the compressor section, the combustor section and the turbine section. The static structure includes a turbine support structure arranged axially between the first turbine rotor and the second turbine rotor. The second turbine rotor is removed from the gas turbine engine. The turbine support structure is removed from the gas turbine engine without removing the first turbine rotor.

According to still another aspect of the present disclosure, a method is provided for assembling a gas turbine engine. During this method, a gas turbine engine assembly is provided that includes a compressor rotor, a combustor, a turbine rotor, a forward portion of a static structure and an outer duct wall. The forward portion of the static structure houses and supports the compressor rotor, the combustor and the turbine rotor. The outer duct wall axially overlaps the combustor, the turbine rotor and the forward portion of the static structure. A turbine support structure is provided. The turbine support structure is assembled with the gas turbine engine assembly such that the turbine support structure is fastened to the forward portion of the static structure and the outer duct wall axially overlaps the turbine support structure.

The method may include assembling a second turbine rotor with the gas turbine engine assembly. The turbine support structure may be arranged axially between the turbine rotor and the second turbine rotor following the assembling of the second turbine rotor.

The gas turbine engine may also include an outer duct wall that axially overlaps the turbine support structure and the second turbine rotor when the gas turbine engine is fully assembled. The outer duct wall may be connected to a forward portion of the static structure during the removing of the second turbine rotor and the removing of the turbine support structure.

The turbine support structure may be configured as or otherwise include a mid-turbine frame.

When the turbine support structure is removed from the gas turbine engine: the outer duct wall may be attached to a forward portion of the static structure; and the combustor section may be housed within and supported by the forward portion of the static structure.

The compressor section may include a compressor rotor. The compressor rotor may be housed within and supported by the forward portion of the static structure when the turbine support structure is removed from the gas turbine engine.

The turbine section may include a turbine rotor. The turbine rotor may be housed within and supported by the forward portion of the static structure when the turbine support structure is removed from the gas turbine engine.

The outer duct wall may axially overlap and circumferentially circumscribe the compressor section, the combustor section and the turbine section.

The turbine section may include a first turbine rotor and a second turbine rotor. The turbine support structure may be arranged axially between the first turbine rotor and the second turbine rotor prior to the removing of the turbine support structure.

The second turbine rotor may be removed from the gas turbine engine prior to the removing the turbine support structure.

The turbine support structure may be removed from the engine without removing the first turbine rotor.

One or more supports may be installed with the static engine structure to support the second turbine rotor prior to the removing of the turbine support structure.

The gas turbine engine may also include a fan section and a fan case housing the fan section. The outer duct wall may be connected to the fan case during the removing of the turbine support structure.

A fan rotor may be removed from the gas turbine engine prior to the removing of the turbine support structure. The fan section may include the fan rotor.

A compressor rotor may be removed from the gas turbine prior to the removing of the turbine support structure. The compressor section may include the compressor rotor.

A turbine exhaust case may be removed from the gas turbine engine prior to the removing the turbine support structure. The static structure may also include the turbine exhaust case.

One or more panels may be removed from the gas turbine engine prior to the removing the turbine support structure. The inner duct wall may include the one or more panels.

One or more external components may be disconnected from an aft portion of the static structure that at least partially houses the turbine section prior to the removing the turbine support structure. The aft portion of the static structure may include the turbine support structure. The one or more components may remain configured with a forward portion of the static structure that is connected to the outer duct wall following the removing of the turbine support structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods for disassembling and assembling (e.g., initial assembling or reassembling) a gas turbine engine. These methods facilitate access to, removal of and/or installation of a turbine support structure such as, but not limited to, a mid-turbine frame. These methods may also reduce (e.g., minimize) disassembly/installation of other components of the gas turbine engine as described below in further detail. For ease of description, the gas turbine engine is described below as a turbofan gas turbine engine for an aircraft propulsion system. The present disclosure, however, is not limited to such an exemplary gas turbine engine nor to aircraft propulsion system applications.

Figure 1:
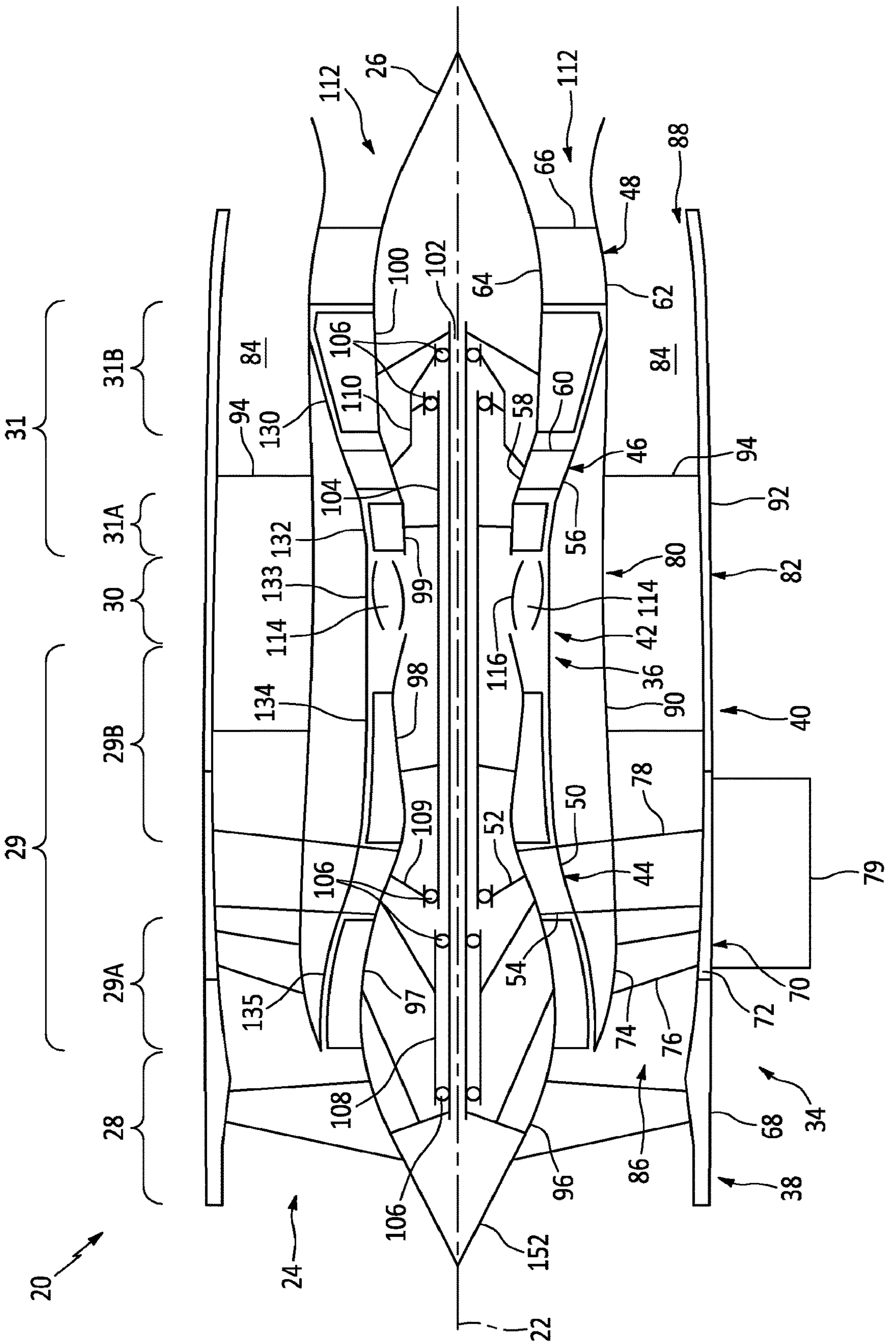
FIG. 1 is a sectional schematic illustration of a turbofan gas turbine engine.

FIG. 1 is a side cutaway illustration of a turbofan gas turbine engine 20, which turbine engine 20 may be disassembled or assembled via the methods of the present disclosure. The turbine engine 20 extends along an axial centerline 22 between an upstream airflow inlet 24 and a downstream exhaust center body 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the axial centerline 22 within an engine housing 34. The engine housing 34 includes an inner static structure 36, an outer static structure 38 and a bypass duct 40.

The inner static structure 36 is configured to house and/or support one or more components of a core of the turbine engine 20, which engine core includes the compressor section 29, the combustor section 30 and the turbine section 31. The inner static structure 36 of FIG. 1 includes a core casing 42, a compressor support structure 44 (e.g., a mid-compressor frame), a turbine support structure 46 (e.g., a mid-turbine frame), a turbine exhaust case 48 and the exhaust center body 26.

The core casing 42 extends axially along and circumferentially about (e.g., completely along) the axial centerline 22. The core casing 42 includes one or more segments (e.g., cases), where one or more of these core casing segments may at least partially form/be included in one or more other of the inner static structure components 44, 46 and/or 48.

The compressor support structure 44 is arranged axially along the axial centerline 22 between the LPC section 29A and the HPC section 29B. The compressor support structure 44 (CSS) of FIG. 1 includes an outer platform 50 (e.g., one of the core casing segments), an inner platform 52 and an array of structural vanes 54 extending radially between and connected to the CSS outer platform 50 and the CSS inner platform 52. These CSS structural vanes 54 structurally tie the CSS outer platform 50 to the CSS inner platform 52. The CSS structural vanes 54 may also provide passage from a radial exterior of the engine core to a radial interior of the engine core for conduits, harnesses, fluid flow (e.g., cooling airflow), etc.

The turbine support structure 46 is arranged axially along the axial centerline 22 between the HPT section 31A and the LPT section 31B. The turbine support structure 46 (TSS) of FIG. 1 includes an outer platform 56 (e.g., one of the core casing segments), an inner platform 58 and an array of structural vanes 60 extending radially between and connected to the TSS outer platform 56 and the TSS inner platform 58. These TSS structural vanes 60 structurally tie the TSS outer platform 56 to the TSS inner platform 58. The TSS structural vanes 60 may also or alternatively provide passage from the radial exterior of the engine core to the radial interior of the engine core for conduits, fluid flow (e.g., cooling airflow), etc.

The turbine exhaust case 48 is arranged axially downstream of the LPT section 31B. The turbine exhaust case 48 (TEC) of FIG. 1 includes an outer platform 62 (e.g., one of the core casing segments), an inner platform 64 and an array of guide vanes 66 extending radially between and connected to the TEC outer platform 62 and the TEC inner platform 64.

The exhaust center body 26 is arranged axially along the axial centerline 22 downstream of the turbine exhaust case 48. The exhaust center body 26 of FIG. 1 is connected to and projects axially out from the TEC inner platform 64.

The outer static structure 38 is configured to house and/or support the fan section 28 and the engine core. The outer static structure 38 of FIG. 1, for example, includes a fan case 68 and an engine core support structure 70.

The fan case 68 is configured to house the fan section 28. The fan case 68 extends axially along and circumferentially about (e.g., completely along) the axial centerline 22.

The engine core support structure 70 is arranged axially along the axial centerline 22 between the fan case 68 and the bypass duct 40. The engine core support structure 70 (ECSS) includes an outer platform 72, an inner platform 74 and an array of fan exit guide vanes 76 extending radially between and connected to the ECSS outer platform 72 and the ECSS inner platform 74. The engine core support structure 70 of FIG. 1 also includes one or more structural vanes 78 extending radially between and connected to the ECSS outer platform 72 and the ECSS inner platform 74. These ECSS structural vanes 78 structurally tie the ECSS outer platform 72 to the ECSS inner platform 74. The ECSS structural vanes 78 may also or alternatively provide passage from a radial exterior of the turbine engine 20 to an engine core region for conduits, harnesses, mechanical couplings (e.g., for an accessory gearbox 79), etc.

The bypass duct 40 extends axially along and circumferentially about (e.g., completely around) the axial centerline 22. The bypass duct 40 of FIG. 1 includes an inner duct wall 80 and an outer duct wall 82. The bypass duct 40 of FIG. 1 forms a (e.g., annular) bypass flowpath 84 that provides a bypass around (e.g., radially outside of and axially along) the engine core. The bypass flowpath 84 of FIG. 1 is formed by and extends radially between the inner duct wall 80 and the outer duct wall 82. The bypass flowpath 84 of FIG. 1 extends axially along the axial centerline 22 between and to an inlet 86 at a downstream end of the fan section 28 and an outlet 88 at a downstream end of the outer duct wall 82.

The inner duct wall 80 is configured to at least partially or completely form a radial inner peripheral boundary of the bypass flowpath 84. The inner duct wall 80 of FIG. 1 includes the ECSS inner platform 74 and an inner barrel 90 of an inner fixed structure (IFS). The inner duct wall 80 of FIG. 1 extends axially along and axially (e.g., partially or completely) overlaps one or more of the engine core sections; e.g., 29A-31B.

The outer duct wall 82 is configured to at least partially or completely form a radial outer peripheral boundary of the bypass flowpath 84. The outer duct wall 82 of FIG. 1 includes the ECSS outer platform 72 and an outer barrel 92 of an outer fixed structure (OF S). The outer duct wall 82 of FIG. 1 extends axially along and axially (e.g., partially or completely) overlaps one or more of the engine core sections (e.g., 29A-31B) and/or engine components (e.g., 44, 46 and 48).

In some embodiments, one or more bifurcations 94 may extend radially across the bypass flowpath 84. Each bifurcation 94 of FIG. 1, for example, extends radially between and is connected to the inner duct wall 80 and the outer duct wall 82. These bifurcations 94 may provide passage across the bypass flowpath 84 for conduits, harnesses, mechanical couplings, etc.

Referring still to FIG. 1, each of the engine sections 28, 29A, 29B, 31A and 31B includes a respective rotor 96-100. Each of these rotors 96-100 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 96 and the LPC rotor 97 are connected to and driven by the LPT rotor 100 through a low speed shaft 102. The HPC rotor 98 is connected to and driven by the HPT through a high speed shaft 104. These engine shafts 102 and 104 (e.g., rotor drive shafts) are rotatably supported by a plurality of bearings 106; e.g., rolling element and/or thrust bearings. Each of these bearing 106 is connected to the engine housing 34 by at least one static support structure 108-110. The static support structures 108 and 109 of FIG. 1 may be connected to and structurally supported by the compressor support structure 44. The static support structure 110 of FIG. 1 may be connected to and structurally supported by the turbine support structure 46.

During operation of the turbine engine 20 of FIG. 1, air enters the turbine engine 20 through the airflow inlet 24. This air is directed through the fan section 28 and into a (e.g., annular) core flowpath 112 and the bypass flowpath 84. The core flowpath 112 extends sequentially through the engine sections 29A-31B; e.g., the engine core. The air within the core flowpath 112 may be referred to as "core air". The air within the bypass flowpath 84 may be referred to as "bypass air".

The core air is compressed sequentially by the LPC rotor 97 and the HPC rotor 98, and directed into a combustion chamber 114 of a combustor 116 in the combustor section 30. Fuel is injected into the combustion chamber 114 and mixed with the compressed core air to provide a fuel-air mixture. This fuel air mixture is ignited and combustion products thereof flow through and sequentially cause the HPT rotor 99 and the LPT rotor 100 to rotate. The rotation of the HPT rotor 99 and the LPT rotor 100 respectively drive rotation of the HPC rotor 98 and the LPC rotor 97 and, thus, compression of the air received from a core flowpath inlet. The rotation of the LPT rotor 100 also drives rotation of the fan rotor 96, which propels bypass air through and out of the bypass flowpath 84. The propulsion of the bypass air may account for a majority of thrust generated by the turbine engine 20.

Figure 2:
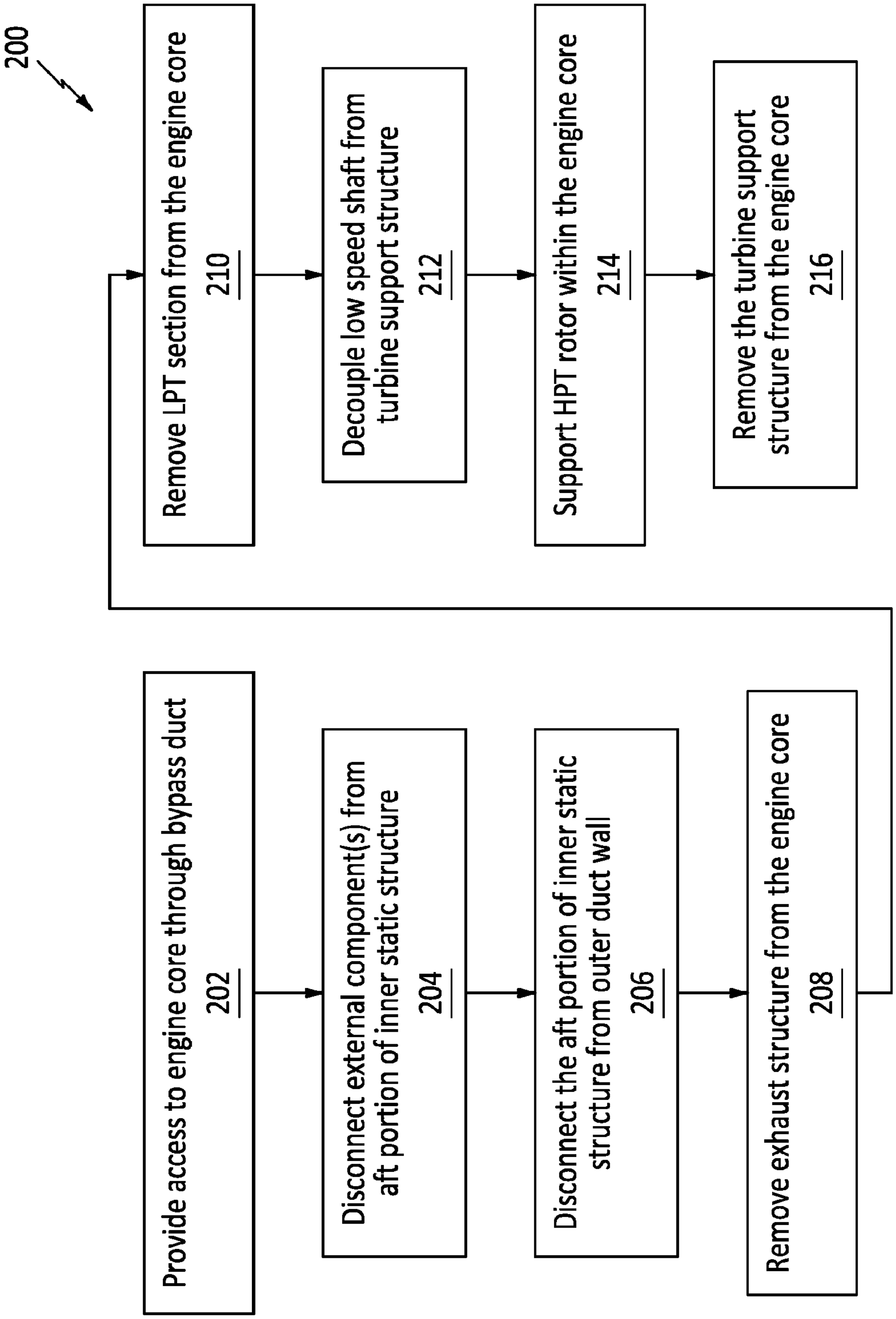
FIG. 2 is a flow diagram of a method of disassembling the turbine engine.

FIG. 2 is a flow diagram of a method 200 for (e.g., partially/selectively) disassembling a gas turbine engine. For ease of description, the method 200 is described below with reference to the turbine engine 20 of FIG. 1. However, the method 200 of the present disclosure is not limited to disassembling such an exemplary gas turbine engine.

Figure 4:
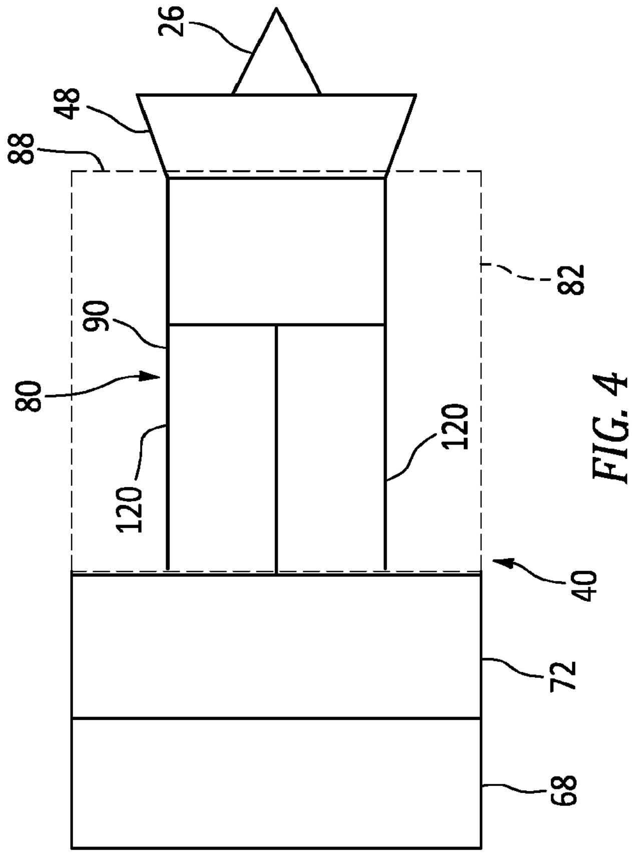
FIG. 4 is a side schematic illustration of the turbine engine with its outer duct wall transparently depicted and its accessory gearbox omitted for ease of illustration.
Figure 3:
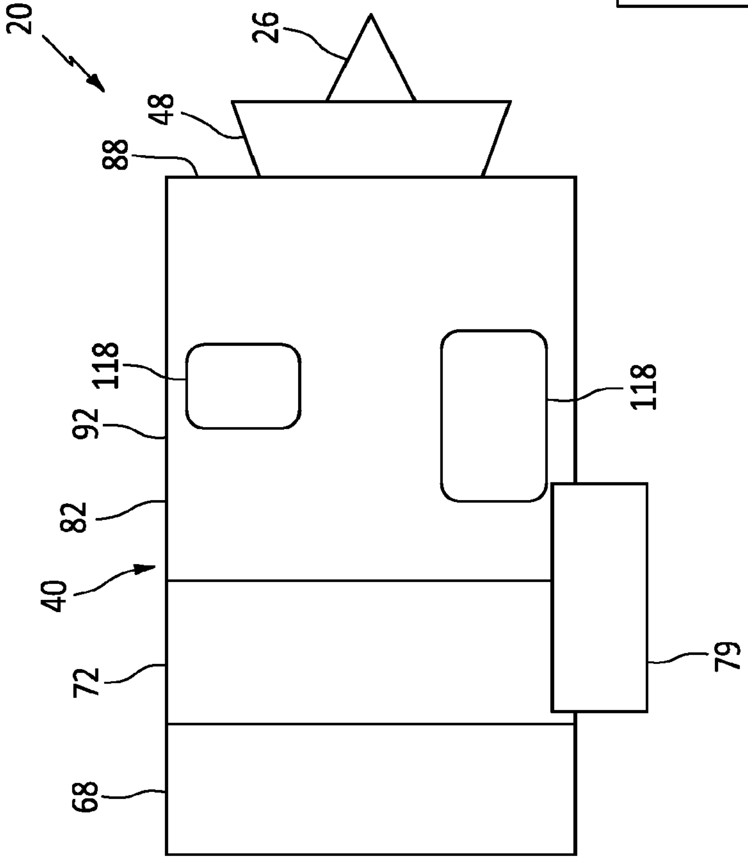
FIG. 3 is a side schematic illustration of the turbine engine.
Figure 5:
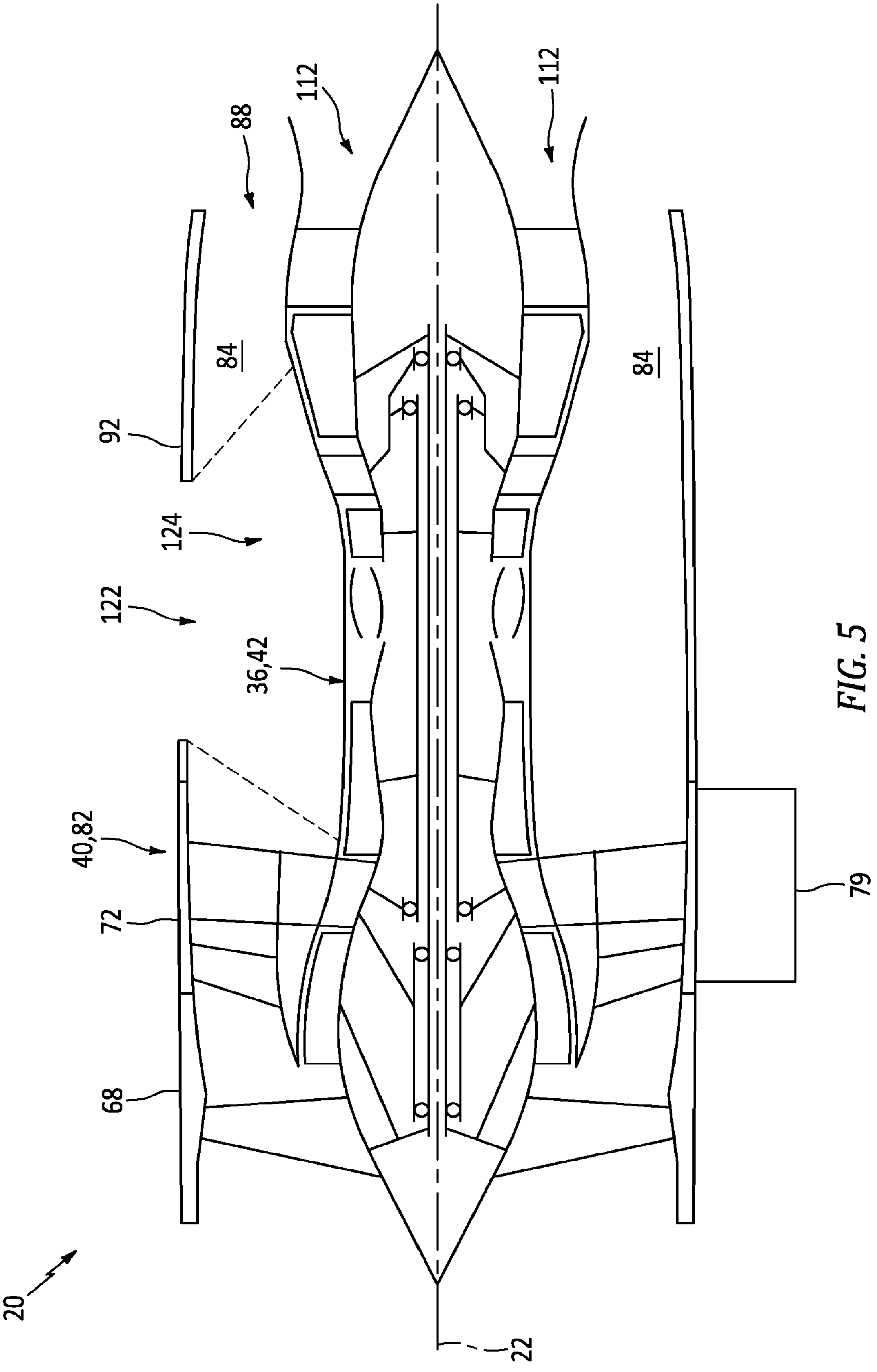
FIG. 5 is a sectional schematic illustration of the turbine engine with one or more access passage(s) opened.

In step 202, access is provided to at least a portion of the engine core through the bypass duct. For example, referring to FIG. 3, one or more outer access panels 118 (e.g., doors) in the outer duct wall 82 and its outer barrel 92 may be removed or otherwise opened to provide access to the inner duct wall 80 (see FIG. 4). Referring to FIG. 4, one or more inner access panels 120 (e.g., duct sidewall segments) in the inner duct wall 80 and its inner barrel 90 may then be removed or otherwise opened to provide access to the engine core and one or more of its various components. During the removal of the inner access panels 120, the panels 120 may be passed through one or more openings 122 (see FIG. 5) in the outer duct wall 82 or passed out of the bypass duct outlet 88. Referring to FIG. 5, following this step 202, the turbine engine 20 may be configured with one or more open passages 124 from an exterior of the turbine engine 20 to the engine core.

Figure 6:
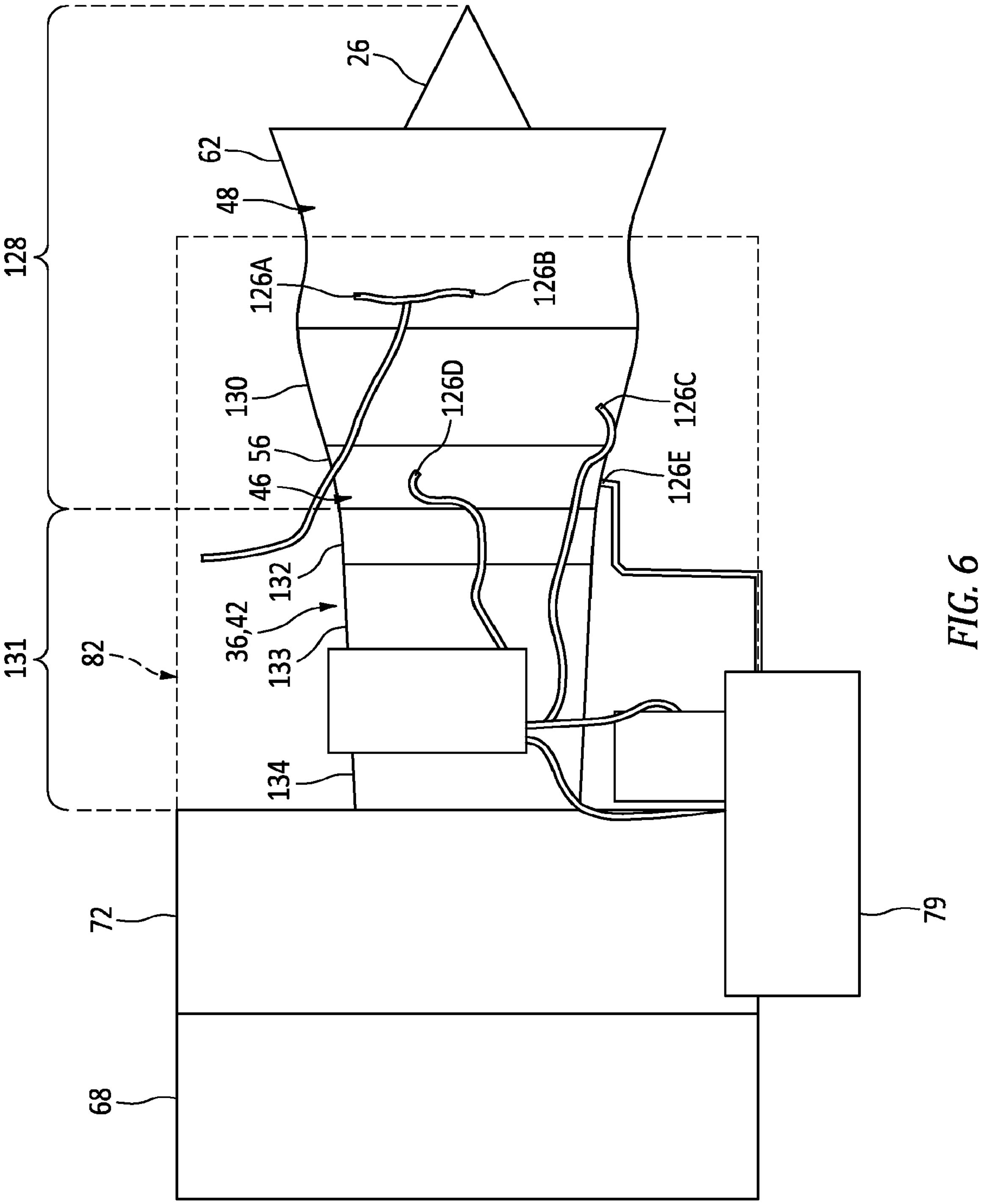
FIG. 6 is a side schematic illustration of the turbine engine configured with various external components connected to an engine core, where the outer duct wall is transparently depicted.

In step 204, one or more external components 126A-E (generally referred to as "126") are disconnected from an aft portion 128 of the inner static structure 36, which aft portion 128 may include one or more components (e.g., 26, 46, 48, 56, 62 and 130) of the inner static structure 36. For example, referring to FIG. 6, one or more electrical harness connections 126A-B (e.g., plugs) and/or one or more conduits 126C-E (e.g., hoses, tubes, etc.) may be disconnected from the inner static structure components 56, 62 and 130. While these external components 126 are disconnected from the aft portion 128 of the inner static structure 36, they may remain otherwise connected to and/or arranged with the turbine engine 20 and its engine core. For example, after disconnecting the external components 126, one or more or all of these components 126 may be temporarily relocated with and/or remain connected to a forward portion 131 of the inner static structure 36, which forward portion 131 may include one or more of the inner static structure components; e.g., see 50, 132-135 in FIG. 1.

Figure 7:
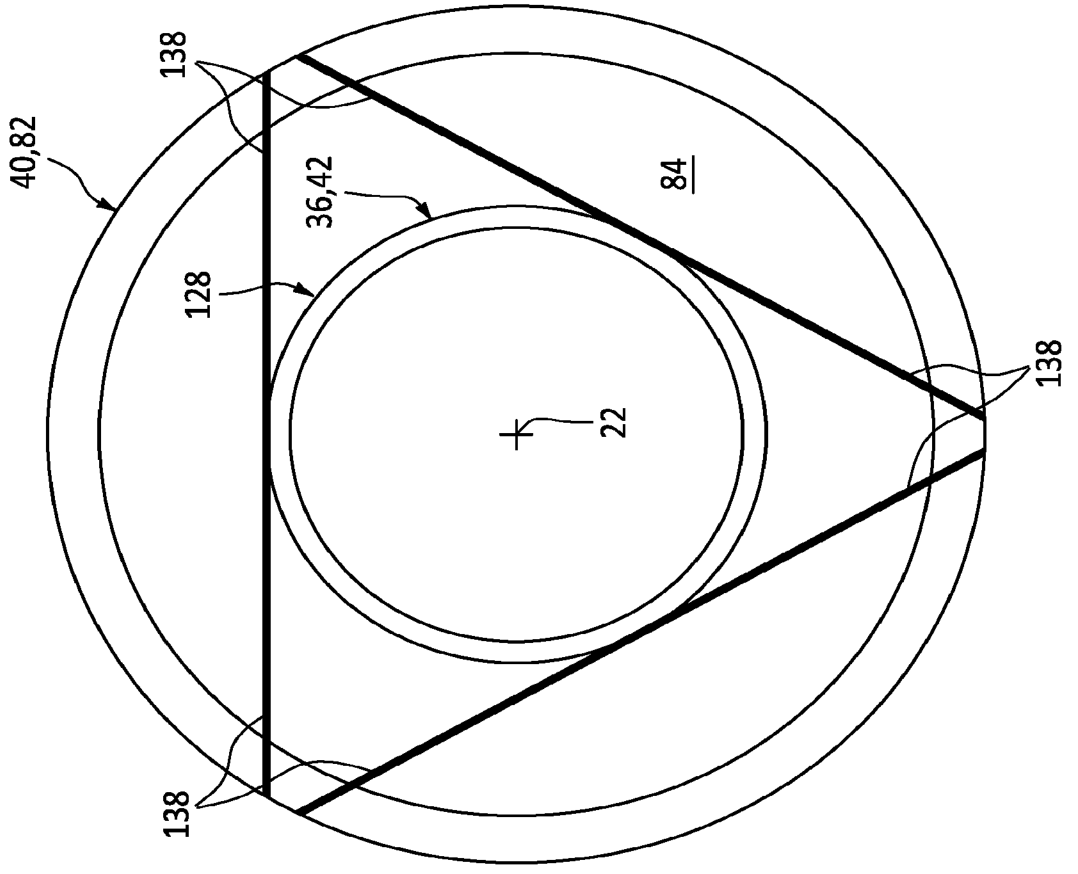
FIG. 7 is a cross-sectional illustration of a portion of the turbine engine.

In step 206, the aft portion 128 of the inner static structure 36 is disconnected from the outer duct wall 82. For example, referring to FIG. 7, one or more structural links 138 are disconnected from the aft portion 128 of the inner static structure 36. One or more of these structural links 138 may be completely removed from the turbine engine 20, or simply disconnected from the aft portion 128 of the inner static structure 36 and moved as needed.

Figure 8:
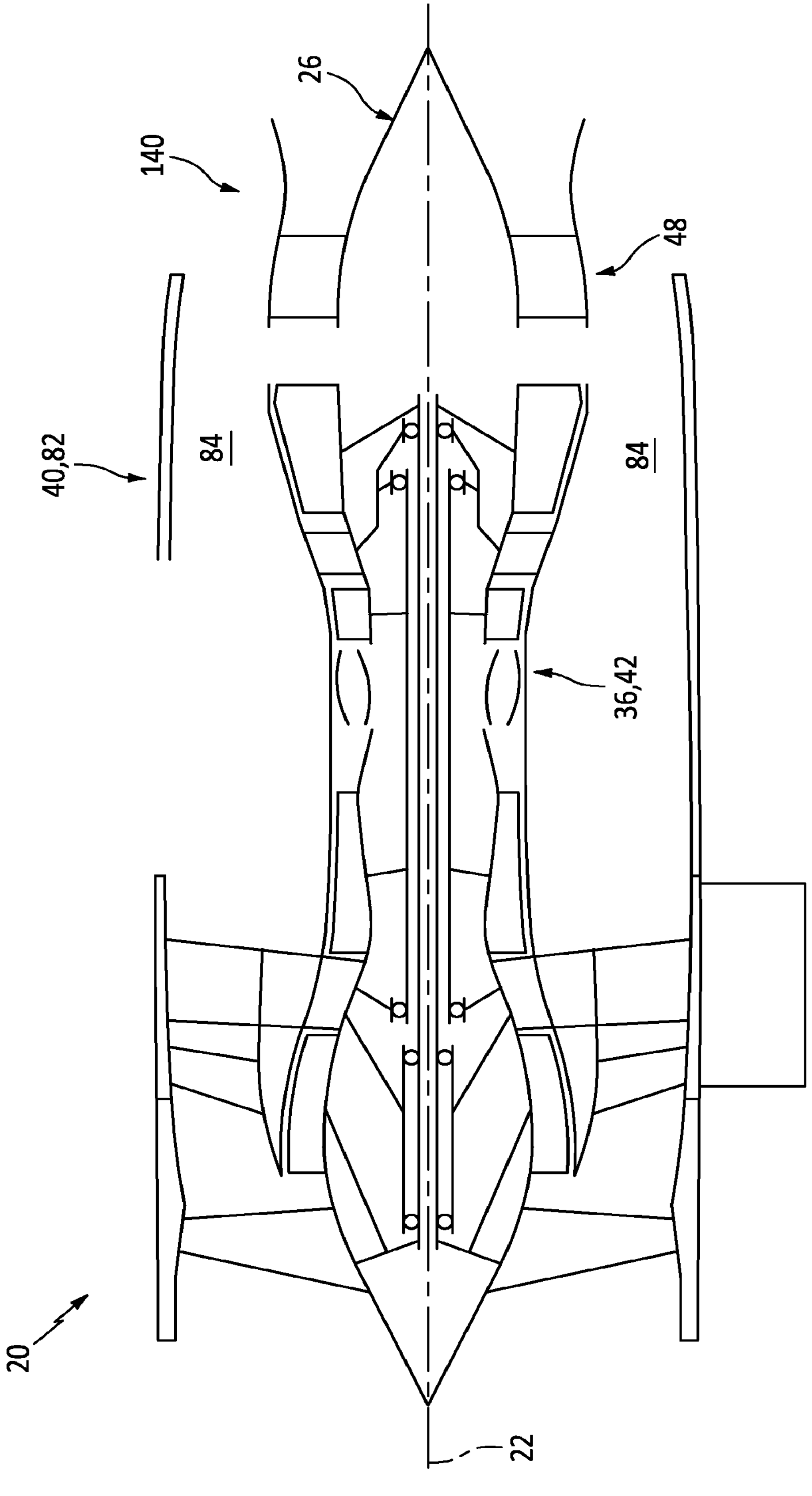
FIG. 8 is a sectional schematic illustration of an exhaust structure being removed from the turbine engine.

In step 208, an exhaust structure 140 is removed from the engine core. For example, referring to FIG. 8, the exhaust center body 26 and the turbine exhaust case 48 are removed from the engine core as a module.

Figure 9:
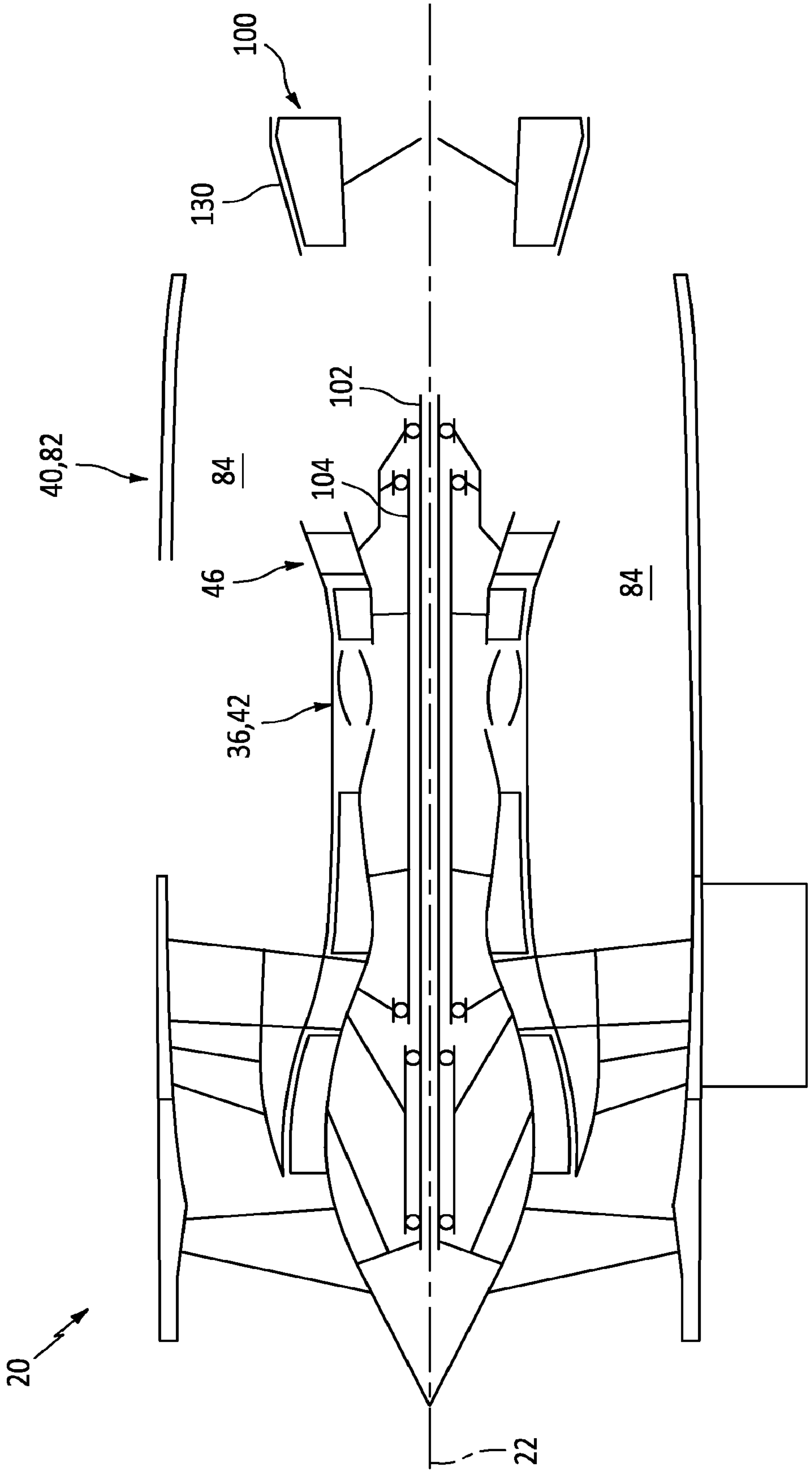
FIG. 9 is a sectional schematic illustration of a low pressure turbine section being removed from the turbine engine.

In step 210, the LPT section 31B (see FIG. 1) is removed from the engine core. For example, referring to FIG. 9, the LPT rotor 100 is disconnected from the low speed shaft 102. The LPT section case 130 (e.g., one of the core casing segments) is disconnected from the turbine support structure 46. The LPT rotor 100 and the LPT section case 130 may then be (e.g., concurrently) extracted from the turbine engine 20 and its outer duct wall 82, for example, as a modular unit.

In step 212, the low speed shaft 102 is decoupled from the turbine support structure 46. For example, referring to still to FIG. 9, the bearing 106 and/or one or more shaft seals may be removed from the engine core.

Figure 11:
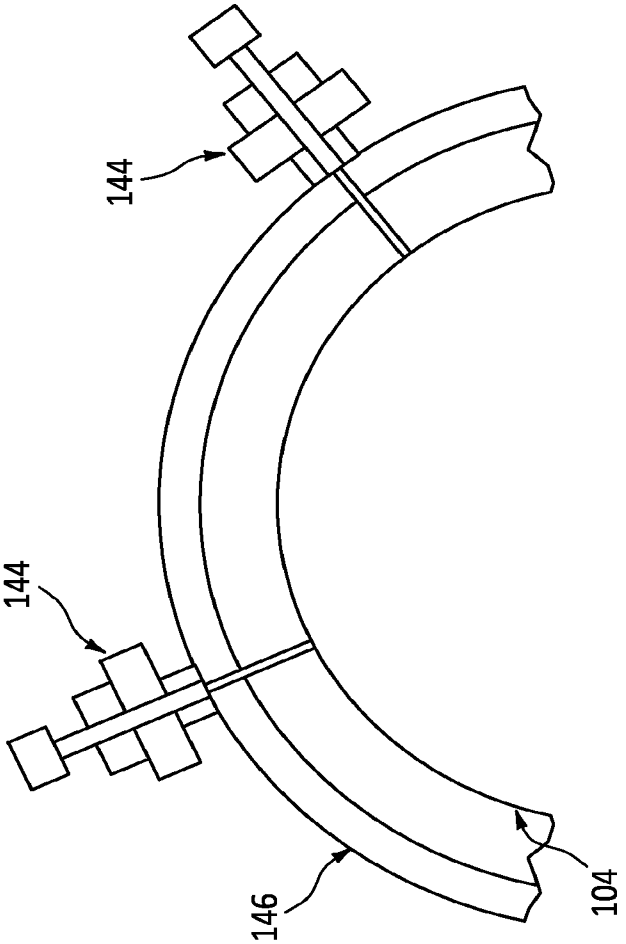
FIG. 11 is an illustration of a support for a high pressure compressor rotor.
Figure 10:
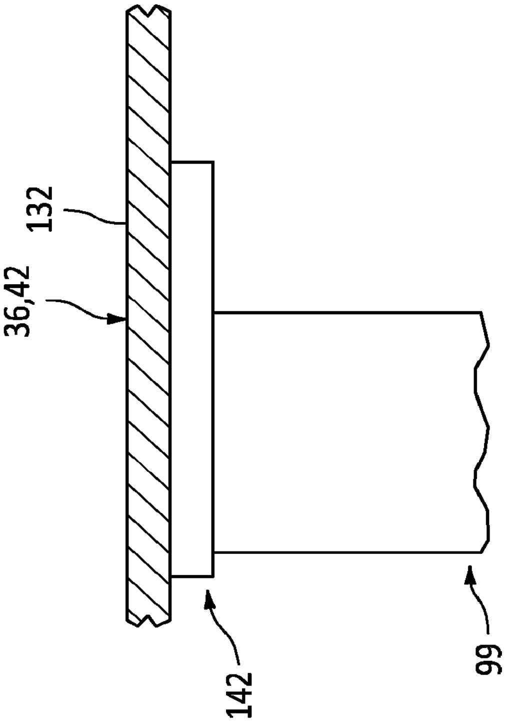
FIG. 10 is an illustration of a support for a high pressure turbine rotor.

In step 214, the HPT rotor 99 is (e.g., temporarily) supported within the engine core. For example, referring to FIG. 10, one or more supports 142 (e.g., shims) are inserted between the HPT rotor 99 and its blades, and the HPT section case 132 (e.g., one of the core casing segments) of the forward portion 131 of the inner static structure 36. Referring to FIG. 11, one or more supports 144 (e.g., support pins) may also or alternatively be installed with an inner structure 146 of the engine core to temporarily position (e.g., center) and support the high speed shaft 104 and the HPC section 29A.

Figure 12:
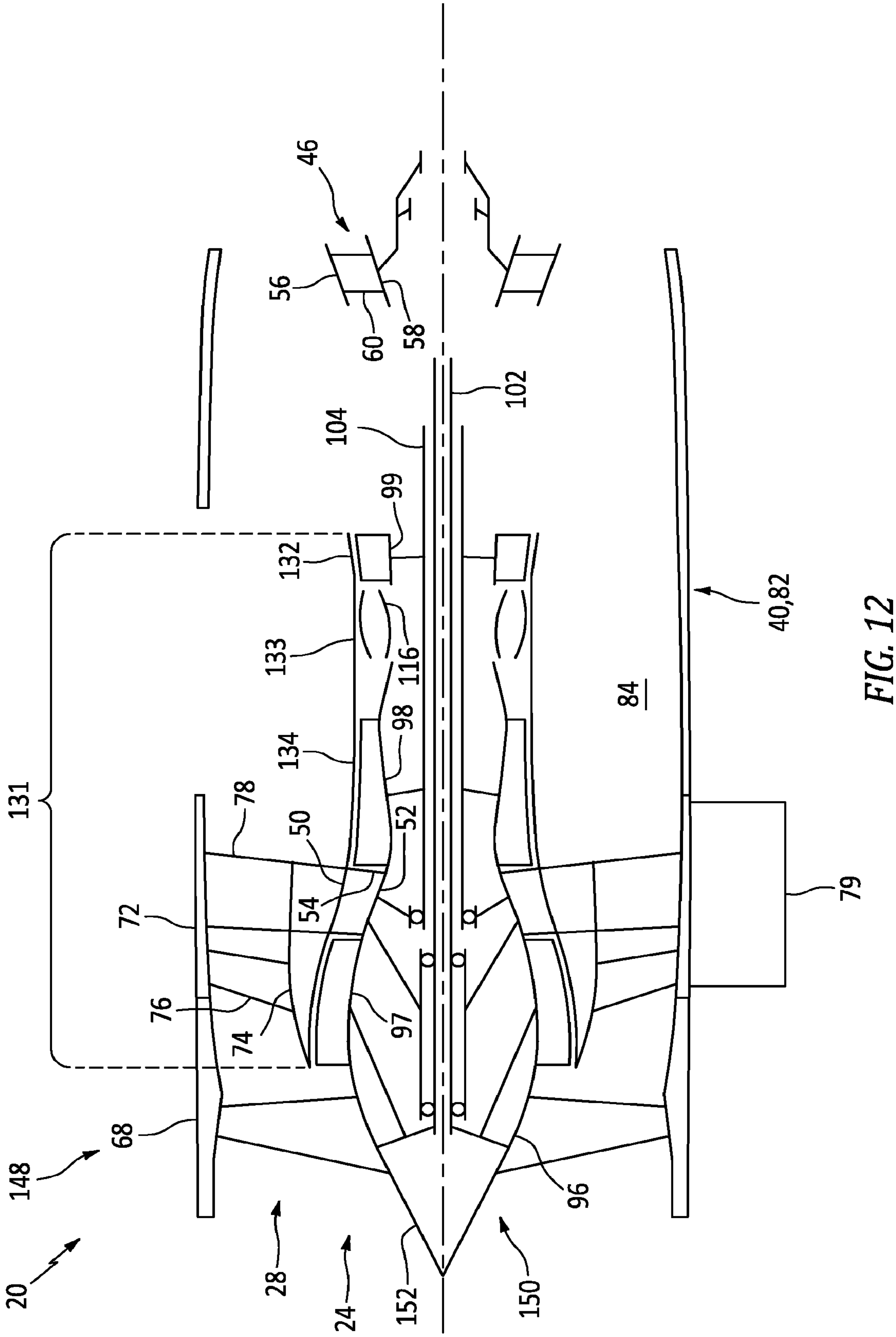
FIG. 12 is a sectional schematic illustration of a turbine support structure being removed from the turbine engine.

In step 216, the turbine support structure 46 is removed from the engine core. For example, referring to FIG. 12, the TSS outer platform 56 is disconnected from the HPT section case 132. The turbine support structure 46 may then be extracted from the turbine engine 20 and its outer duct wall 82. Following the removal of the turbine support structure 46, many other parts of the turbine engine 20 may remain assembled or otherwise generally in place. In other words, the method 200 facilitates removal of the turbine support structure 46 without disassembly and/or removal of many (e.g., most) other turbine engine components such as, but not limited to, 40, 50, 52, 54, 68, 72, 74, 76, 79, 82, 96-99, 102, 104, 116 and 132-134—a gas turbine engine assembly 148.

Following removal of the turbine support structure 46 from the turbine engine 20, the turbine support structure 46 may be inspected, repaired and/or replaced as needed. The steps of the method 200 may then be repeated (in reverse order and in reverse fashion) in order to reinstall the turbine support structure 46 with the gas turbine engine assembly 148 and, more particularly, reassemble the gas turbine engine 20 into its assembled form.

While the steps described above in the method 200 as described as being performed sequentially in a certain order, some of these method steps may be re-ordered in other embodiments and/or performed concurrently (e.g., simultaneously or partially overlapping). Furthermore, it is contemplated that some of the method steps may be omitted (e.g., the steps 212 and/or 214) or replaced with alternative steps depending upon the specific configuration of the turbine engine 20. It is further contemplated that the method 200 may include one or more additional steps.

Figure 13:
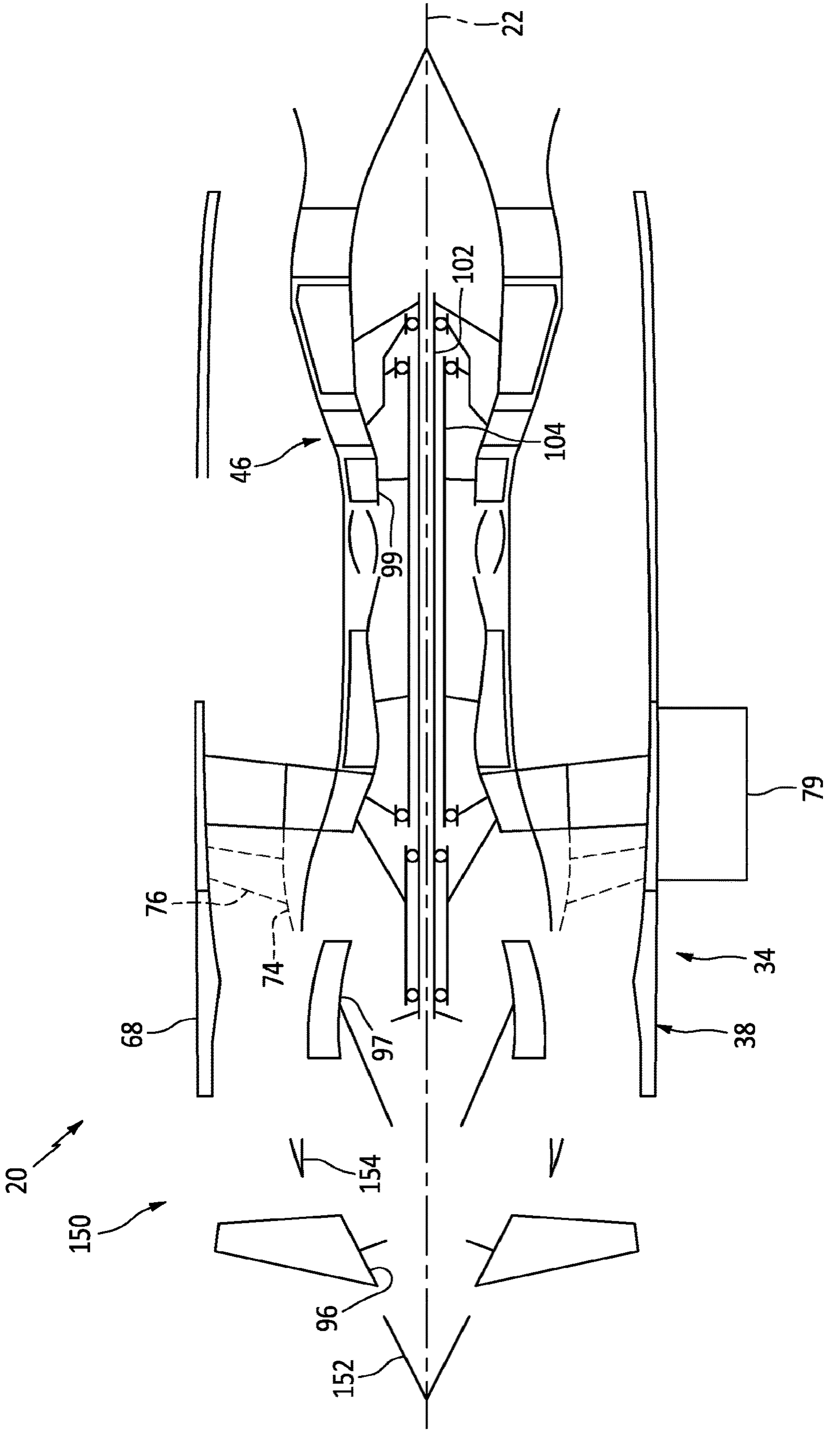
FIG. 13 is a sectional schematic illustration of a front end/upstream portion being removed from the turbine engine.

In some embodiments, referring to FIG. 13, a front end/upstream portion 150 of the turbine engine 20 may be removed to facilitate supporting, for example, the HPT rotor 99 prior to removing the turbine support structure 46. For example, a fan nose cone 152 may be disconnected from the fan rotor 96 and removed from the turbine engine 20. The fan rotor 96 may removed from the turbine engine 20 and its fan case 68. An inlet splitter 154 may be removed from the engine housing 34. One or more or all of the fan exit guide vanes 76 may be removed from the turbine engine 20 and its outer static structure 38. The inner platform 74 may removed from the turbine engine 20. The LPC rotor 97 may be disconnected from the low speed shaft 102 and subsequently removed from the turbine engine 20. Removal of the LPC rotor 97 may facilitate front end/upstream access for supporting the HPT rotor 99 through a bore of one of the shafts 102, 104.

To facilitate removal of various components from the turbine engine 20 without removing the outer duct wall 82, one or more of those components may be attached to cradles, carts, carriages or other movable supports for extracting the components axially along the axial centerline 22 without, for example, brushing against, bumping and/or otherwise interfering with other turbine engine components which remain installed.

The method 200 may be performed while the turbine engine 20 remains installed with an aircraft; e.g., mounted on wing or to a fuselage. Alternatively, the method 200 may be performed while the turbine engine 20 is removed from the aircraft within, for example, a maintenance center. In either case, the method 200 may significantly reduce disassembly (or assembly) time and complexity since various turbine engine components may remain in place and/or installed during the method 200 as described above.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for assembling a gas turbine engine, comprising:

providing a gas turbine engine assembly that includes
- a compressor rotor;
- a combustor;
- a turbine rotor;
- a forward portion of a static structure housing and supporting the compressor rotor, the combustor and the turbine rotor; and
- a bypass duct including an inner duct wall, an outer duct wall and a bypass flowpath formed radially between the inner duct wall and the outer duct wall, the outer duct wall axially overlapping the combustor, the turbine rotor and the forward portion of the static structure;

providing a turbine support structure, the turbine support structure previously assembled then disconnected from the gas turbine engine assembly; and reassembling the turbine support structure with the gas turbine engine assembly such that the turbine support structure is fastened to the forward portion of the static structure and the outer duct wall axially overlaps the turbine support structure;

wherein the outer duct wall remains installed during the step of reassembling the turbine support structure with the gas turbine engine assembly.

2. The method of claim 1, further comprising assembling a second turbine rotor with the gas turbine engine assembly, wherein the turbine support structure is arranged axially between the turbine rotor and the second turbine rotor following the assembling of the second turbine rotor.

3. The method of claim 2, further comprising assembling an exhaust structure with the gas turbine engine assembly, wherein the second turbine rotor is arranged axially between the turbine support structure and the exhaust structure following the assembling of the exhaust structure.

4. The method of claim 2, wherein the second turbine rotor includes a second turbine section case.

5. The method of claim 1, wherein the turbine support structure comprises a mid-turbine frame.

6. The method of claim 1, further comprising assembling one or more panels comprising the inner duct wall of the gas turbine engine assembly.

7. The method of claim 1, wherein the gas turbine engine assembly further comprises a fan section and a fan case housing the fan section, and the outer duct wall is connected to the fan case.

8. The method of claim 1, wherein the gas turbine engine assembly is installed with an aircraft.

9. The method of claim 1, wherein one or more external components are configured with the forward portion of the static structure that is connected to the outer duct wall prior to the step of reassembling the turbine support structure with the gas turbine engine assembly.

10. The method of claim 9, further comprising connecting the one or more external components to the turbine support structure.

11. A method for assembling a gas turbine engine, comprising:

providing an aircraft and a gas turbine engine assembly installed with the aircraft, the gas turbine engine assembly including a compressor rotor, a combustor, a turbine rotor, a forward portion of a static structure and a bypass duct, the forward portion of the static structure housing and supporting the compressor rotor, the combustor and the turbine rotor, the bypass duct including an inner duct wall, an outer duct wall and a bypass flowpath formed radially between the inner duct wall and the outer duct wall, and the outer duct wall axially overlapping the combustor, the turbine rotor and the forward portion of the static structure;

providing a turbine support structure at a location outside of the aircraft, the turbine support structure previously assembled then disconnected from the gas turbine engine assembly;

providing a second turbine rotor at the location outside of the aircraft, the second turbine rotor previously assembled then disconnected from the gas turbine engine assembly;

reassembling the turbine support structure with the gas turbine engine assembly such that the turbine support structure is fastened to the forward portion of the static structure and the outer duct wall axially overlaps the turbine support structure; and reassembling the second turbine rotor with the gas turbine engine assembly, wherein the turbine support structure is arranged axially between the turbine rotor and the second turbine rotor following the assembling of the second turbine rotor;

wherein the outer duct wall remains installed during the step of reassembling the turbine support structure with the gas turbine engine assembly.

12. The method of claim 11, wherein the gas turbine engine assembly is mounted on a wing or a fuselage of the aircraft.

13. The method of claim 11, further comprising assembling one or more panels comprising the inner duct wall of the gas turbine engine assembly.

14. The method of claim 11, wherein the gas turbine engine assembly further comprises a fan section and a fan case housing the fan section, and the outer duct wall is connected to the fan case.

15. The method of claim 11, further comprising assembling an exhaust structure with the gas turbine engine assembly, wherein the second turbine rotor is arranged axially between the turbine support structure and the exhaust structure following the assembling of the exhaust structure.

* * * * *